(12) United States Patent
Yoshino et al.

(10) Patent No.: US 8,374,805 B2
(45) Date of Patent: Feb. 12, 2013

(54) CORIOLIS MASS FLOWMETER

(75) Inventors: Akinori Yoshino, Tokyo (JP); Nobuo Miyaji, Tokyo (JP); Akimichi Kadoguchi, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 191 days.

(21) Appl. No.: 12/942,614

(22) Filed: Nov. 9, 2010

(65) Prior Publication Data

US 2011/0107849 A1    May 12, 2011

(30) Foreign Application Priority Data

Nov. 10, 2009 (JP) ................................. 2009-256944

(51) Int. Cl.
*G01F 1/00* (2006.01)
*G06F 19/00* (2011.01)

(52) U.S. Cl. .................. 702/45; 73/861.12; 73/861.356; 702/50; 702/56

(58) Field of Classification Search .................... 702/45, 702/55, 56, 74, 100, 106, 137, 138, 156, 702/50; 73/861.01, 861.02, 861.12, 861.16, 73/861.17, 861.37, 861.38
See application file for complete search history.

(56) References Cited

U.S. PATENT DOCUMENTS

| 5,369,999 | A | 12/1994 | Yoshida |
| 5,497,665 | A | 3/1996 | Cage et al. |
| 6,493,642 | B1 * | 12/2002 | Hussain .......................... 702/45 |
| 2008/0189067 | A1 | 8/2008 | Duffill et al. |

FOREIGN PATENT DOCUMENTS

| EP | 0701107 A2 | 3/1996 |
| GB | 2350426 A | 11/2000 |
| JP | 63-165718 A | 7/1988 |
| JP | 2-262019 A | 10/1990 |
| JP | 4-52516 A | 2/1992 |
| JP | 5-248902 A | 9/1993 |
| JP | 7-181069 A | 7/1995 |
| JP | 07-113562 B2 | 12/1995 |
| JP | 2003-302272 A | 10/2003 |
| JP | 2009509163 A | 3/2009 |

OTHER PUBLICATIONS

Japanese Office Action issued Nov. 1, 2011 in corresponding Japanese Patent Application No. 2009-256944.
Communication dated Dec. 29, 2011 from the European Patent Office in counterpart European application No. 10190582.6.
Chinese Office Action dated Mar. 1, 2012 issued by the State Intellectual Property Office of P.R. China in counterpart Chinese Patent Application No. 201010539994.6.

* cited by examiner

*Primary Examiner* — John H Le
(74) *Attorney, Agent, or Firm* — Sughrue Mion, PLLC

(57) ABSTRACT

A Coriolis mass flowmeter includes a vibrator configured to vibrate a measurement conduct line, an upstream sensor and a downstream sensor, which are placed at a certain distance in the measurement conduct line and are configured to detect the vibration of the measurement conduct line, a first effective value reception section configured to receive an effective value of the first signal, a second effective value reception section configured to receive an effective value of the second signal, a ratio computation section configured to receive the effective value of the first signal and the effective value of the second signal and to compute the ratio of both values, and an anomaly diagnosis section configured to make a comparison between the computed ratio and a certain value and to generate an alarm.

6 Claims, 6 Drawing Sheets

CORIOLIS MASS FLOWMETER

TECHNICAL FIELD

The present disclosure relates to a Coriolis mass flowmeter for computing the mass flow rate of a fluid flowing through a measurement conduct line based on the phase difference between a first signal of an upstream sensor and a second signal of a downstream sensor placed at a certain distance in the measurement conduct line vibrating by a vibrator, and having an excitation circuit section for receiving the first signal or the second signal and controlling a drive signal of the vibrator so that the amplitude of the first signal or the second signal becomes a target value.

RELATED ART

Patent Document 1 discloses the configuration of a sensor section of a Coriolis mass flowmeter and signal processing of mass flow rate computation. Patent Document 2 discloses an excitation circuit section for controlling a drive signal of a vibrator.

FIG. 4 is a basic configuration drawing of the sensor section of the Coriolis mass flowmeter. In a sensor section 10, both ends of a measurement conduct line 11 for allowing a measured fluid F to flow are fixed to support members 12 and 13. A vibrator 14 for mechanically vibrating the measurement conduct line 11 up and down is installed in the proximity of the center the measurement conduct line 11 and is driven by a drive signal DV.

An upstream sensor 15 and a downstream sensor 16 for detecting vibration of the measurement conduct line 11 are placed in the proximity fixed to the support members 12 and 13 of the measurement conduct line 11.

FIG. 5 is a schematic drawing to describe primary mode and secondary mode vibration. When the measured fluid F flows into the measurement conduct line 11 in a state in which vibration is given to from the vibrator 14 to the measurement conduct line 11 in the primary mode as shown in M1 and M2, the measurement conduct line 11 vibrates in the secondary mode as shown in M3 and M4.

In fact, the measurement conduct line 11 vibrates in a superposition form of the two types of vibration patterns. The vibration deformation of the measurement conduct line 11 is detected by a frequency detection signal (hereinafter, first signal) SA of the upstream sensor 15 and a frequency detection signal (hereinafter, second signal) SB of the downstream sensor 16.

FIG. 6 is a function block diagram to show a general configuration example of the Coriolis mass flowmeter. The first signal SA of the upstream sensor 15 (or/and the second signal SB of the downstream sensor 16) is input to an excitation circuit section 20 including auto gain control (AGC) for maintaining the amplitude of the first signal SA or the second signal SB in a target value, is smoothed in a smoothing circuit 21, and is converted into DC voltage proportional to the effective value.

The DC voltage is compared with a target voltage given in a target value setting section 22 by a comparison section 23, the deviation is passed to a variable amplifier 24, and a drive signal DV of a drive output section 25 controlled by output CV of the variable amplifier 24 is given to the vibrator 14. This feedback control system controls the amplitude of the first signal SA to the target value. The excitation circuit section 20 is disclosed in Patent Document 2.

The first signal SA of the upstream sensor 15, the second signal SB of the downstream sensor 16, and a temperature detection signal SH for compensation for temperature are input to a signal computation processing section 30, and the signals SA, SB, and SH are sampled/held by track-and-holds 31, 32, and 33 controlled at a sampling timing T generated from a clock.

Hold signals of the track-and-holds 31, 32, and 33 are converted into digital signals by analog/digital converters 34, 35, and 36. The digital values of the first signal SA and the second signal SB provided by the analog/digital converters 34 and 35 are input to a flow rate computation section 39 through low-pass filters 37 and 38. The digital value of the temperature signal SH provided by the analog/digital converter 36 is directly input to the flow rate computation section 39.

The flow rate computation section 39 computes and outputs mass flow rate Q of the fluid F flowing through the measurement conduct line 11 based on the input signals. Signal processing of the flow rate computation section 39 for executing phase difference computation, etc., by Hilbert transform processing, etc., is disclosed in Patent Document 1 and therefore will not be discussed.

In the Coriolis mass flowmeter, when a sensor signal is affected by disturbance of fluid density, flow rate, temperature, vibration of the measurement conduct line, etc., whether the cause is disturbance or the effect produced by an anomaly of the sensor or the measurement conduct line is not determined and an erroneous diagnosis is conducted. Thus, a degradation diagnosis function of the measurement conduct line is required.

A related-art degradation diagnosis technique disclosed in Patent Document 3 is an offline diagnosis wherein a sensor tube is once vibrated and the excitation is stopped in a state in which a fluid does not flow into the sensor tube, vibration attenuation after the stop of the excitation is measured, an anomaly is detected, and an alarm is issued.

[Patent Document 1] Japanese Patent Laid-Open No. 181069/1995

[Patent Document 2] Japanese Patent Laid-Open No. 2003-302272

[Patent Document 3] Japanese Patent Laid-Open No. 52516/1992

The related-art degradation diagnosis technique of the measurement conduct line involves the following problems:
(1) In an online state in which the mass flow rate of a fluid flowing through the measurement conduct line is measured, a degradation diagnosis cannot be conducted.
(2) A special measuring device for a degradation diagnosis needs to be added and the cost of the device is increased.

SUMMARY

Exemplary embodiments of the present invention provide a Coriolis mass flowmeter for malting it possible to conduct a degradation diagnosis of a measurement conduct line based on a signal in an online state without adding a special measuring device for the degradation diagnosis.

A Coriolis mass flowmeter, according to an exemplary embodiment, comprises:
a vibrator configured to vibrate a measurement conduct line;
an upstream sensor and a downstream sensor, which are placed at a certain distance in the measurement conduct line and are configured to detect vibration of the measurement conduct line;
a signal computation processing section configured to compute a mass flow rate of a fluid flowing through the measurement conduct line vibrated by the vibrator based on a phase difference between a first signal of the upstream sensor and a second signal of the downstream sensor;

an excitation circuit section configured to receive the first signal or the second signal and to control a drive signal of the vibrator so that the amplitude of the first signal or the second signal becomes a target value;

a first effective value reception section configured to receive an effective value of the first signal;

a second effective value reception section configured to receive an effective value of the second signal;

a ratio computation section configured to receive the effective value of the first signal and the effective value of the second signal and to compute the ratio of both values; and an anomaly diagnosis section configured to make a comparison between the computed ratio and a certain value and to generate an alarm.

The Coriolis mass flowmeter may further comprises:

a sensor signal assignment section configured to periodically switch the first signal and the second signal, and to output the switched signal to the excitation circuit section, wherein the excitation circuit section is configured to receive the first signal or the second signal through the sensor signal assignment section, and to control the drive signal of the vibrator so that the amplitude of the received signal becomes the target value, and wherein the ratio computation section is configured to receive a hold voltage of the effective value of the first signal and a hold voltage of the effective value of the second signal in operative association with the switching, and to compute the ratio of both voltages.

The Coriolis mass flowmeter may further comprises:

an analog/digital converter configured to convert the first signal and the second signal into digital signals, wherein the effective value of the first signal and the effective value of the second signal are given based on digital values of the digital signals.

The effective value of the first signal and the effective value of the second signal may be given based on detection values of the first signal and the second signal The anomaly diagnosis section may be configured to directly receive the hold voltages of the effective values of the first signal and the second signal, to compare one of the voltages with a threshold value, and to generate an alarm.

A Coriolis mass flowmeter, according to an exemplary embodiment, comprises:

a vibrator configured to vibrate a measurement conduct line;

an upstream sensor and a downstream sensor, which are placed at a certain distance in the measurement conduct line and are configured to detect vibration of the measurement conduct line;

a signal computation processing section configured to compute a mass flow rate of a fluid flowing through the measurement conduct line vibrated by the vibrator based on a phase difference between a first signal of the upstream sensor and a second signal of the downstream sensor;

a sensor signal assignment section configured to periodically switch the first signal and the second signal;

an excitation circuit section configured to receive the first signal or the second signal through the sensor signal assignment section, and to control a drive signal of the vibrator so that the amplitude of the received signal becomes a target value;

a ratio computation section configured to receive a hold voltage of an effective value of the drive signal of the vibrator or a hold voltage of an effective value of a signal proportional to the drive signal in operative association with the switching, and to compute the ratio of the hold voltage received at the switching to the first signal and the hold voltage received at the switching to the second signal; and an anomaly diagnosis section configured to make a comparison between the computed ratio and a threshold value, and to generate an alarm.

The anomaly diagnosis section may be configured to directly receive the hold voltage of the effective value of the drive signal of the vibrator or the hold voltage of the effective value of the signal proportional to the drive signal in operative association with the switching, to compare the voltage with a threshold value, and to generate an alarm.

According to the exemplary embodiments, the following advantages can be expected:

(1) A degradation diagnosis in the online state in which the mass flow rate of a fluid flowing through the measurement conduct line is measured can be conducted.

(2) A special measuring device for a degradation diagnosis need not be added, a degradation diagnosis of the measurement conduct line can be conducted based on a signal in the online state, and the cost of the device can be reduced.

Other features and advantages may be apparent from the following detailed description, the accompanying drawings and the claims.

DETAILED DESCRIPTION

Figure 1:
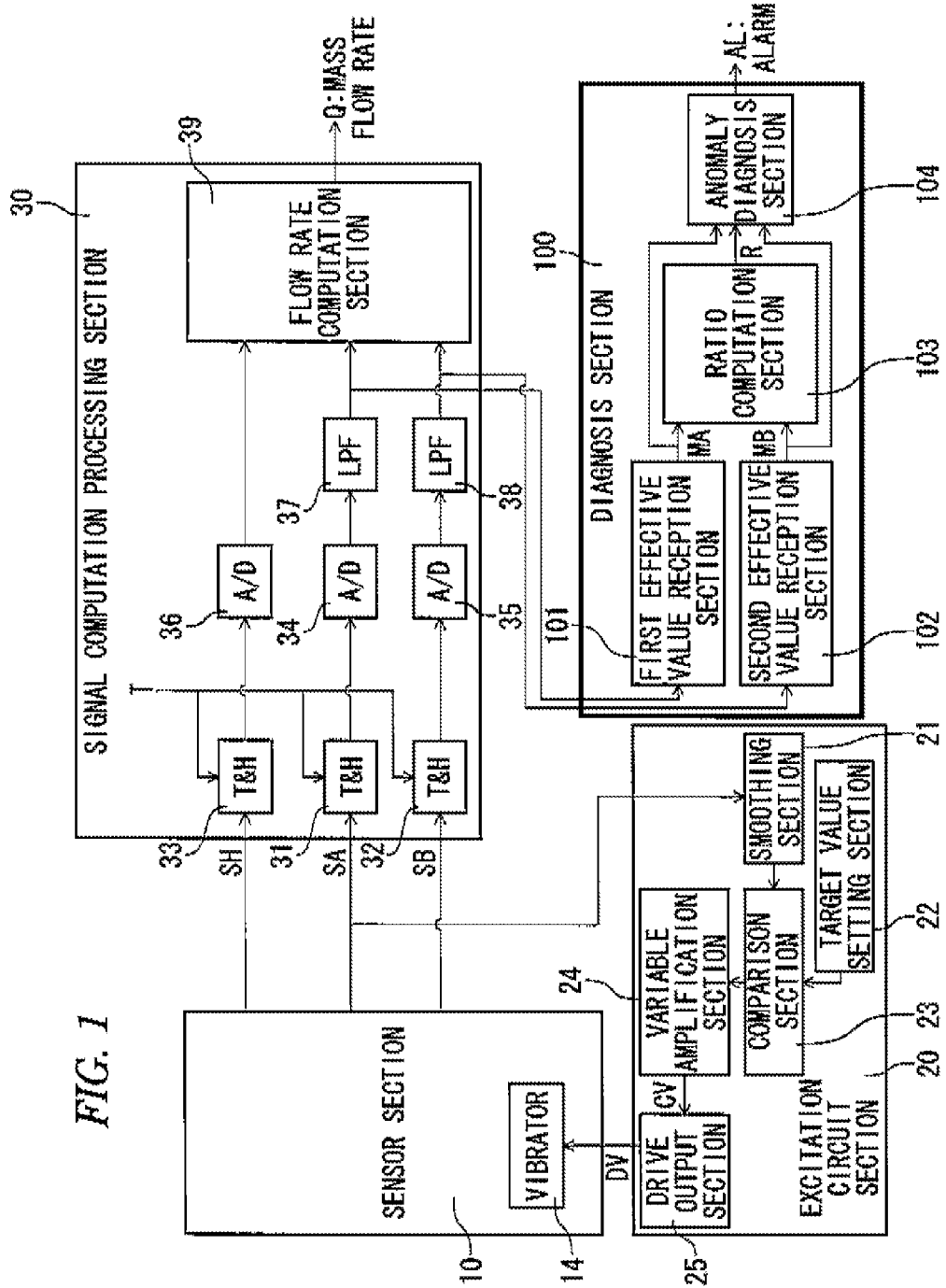
FIG. 1 is a function block diagram to show one embodiment of a Coriolis mass flowmeter according to the invention.

Exemplary embodiments will be discussed below in detail with the accompanying drawings: FIG. 1 is a function block diagram to show one embodiment of a Coriolis mass flowmeter according to the invention. Components identical with those previously described with reference to FIG. 6 are denoted by the same reference numeral in FIG. 1 and will not be discussed again.

Figure 6:
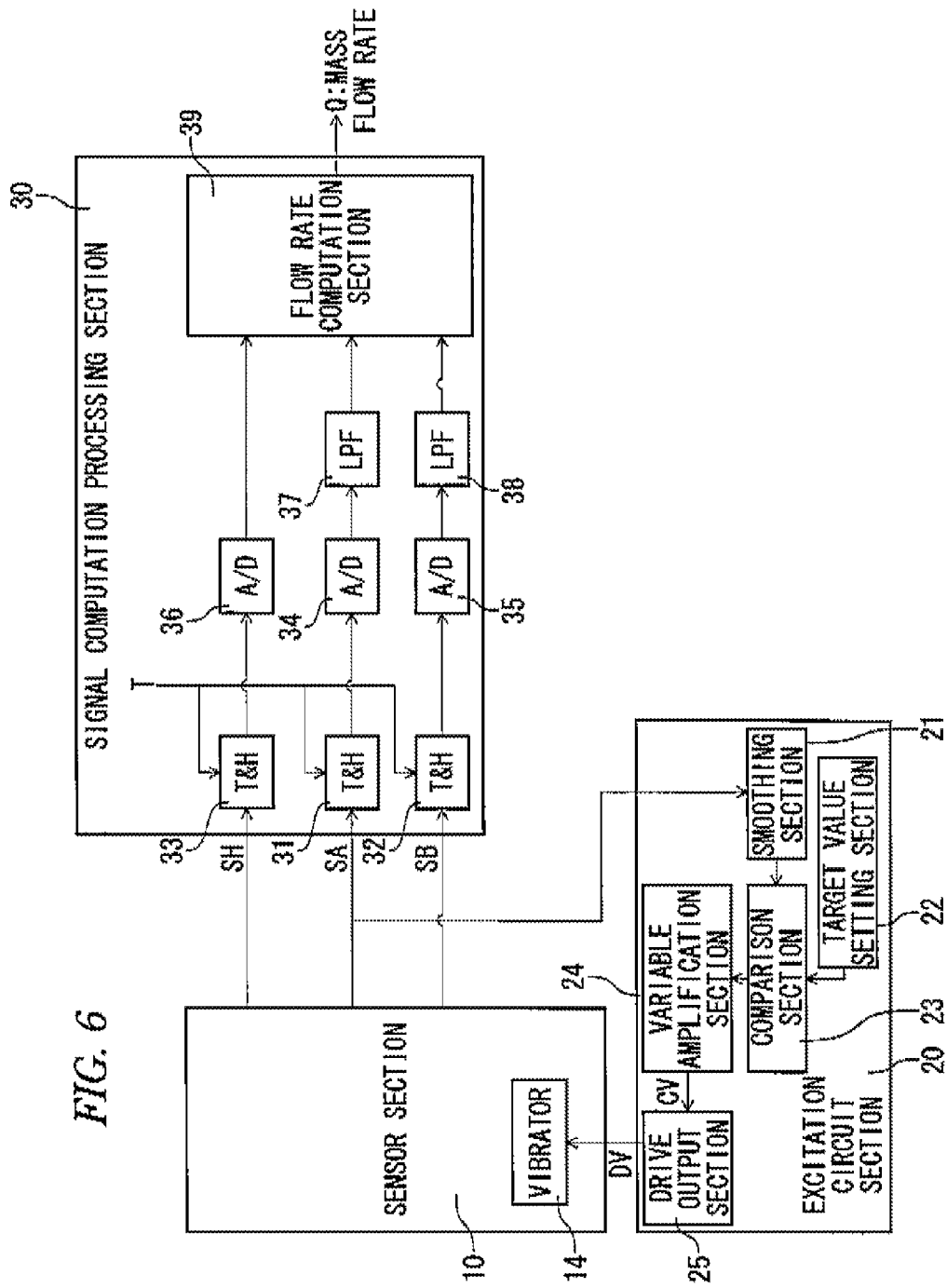
FIG. 6 is a function block diagram to show a general configuration example of the Coriolis mass flowmeter.

A section added to the general configuration described in FIG. 6 is a diagnosis section 100. The diagnosis section 100 includes a first effective value reception section 101, a second effective value reception section 102, a ratio computation section 103, and an anomaly diagnosis section 104.

The first effective value reception section 101 receives the effective value of a sine wave output by a low-pass filter 37, provided by converting a first signal SA into a digital value, and outputs MA. The second effective value reception section 102 receives the effective value of a sine wave output by a low-pass filter 38, provided by converting a second signal SB into a digital value, and outputs MB.

The ratio computation section 103 receives the signals MA and MB, computes a ratio R of the two signals as R=MB/MA, and passes the result to the anomaly diagnosis section 104. The anomaly diagnosis section 104 makes a comparison between the ratio R and a threshold value and determines whether or not the state is abnormal. If the state is abnormal, the anomaly diagnosis section 104 outputs an alarm AL to the outside. The alarm based on monitoring the ratio R is effective for an anomaly diagnosis of partial corrosion, wear, clogging, etc., in a measurement conduct line.

An operation example of the anomaly diagnosis section 104 will be discussed. For example, at the normal time, it is assumed that the first signal SA and the second signal SB deviate about 5%. However, the deviation varies because of disturbance. If a threshold value is set for detecting the effect of partial corrosion only when the deviation changes by ±15% of its initial deviation or more, if the ratio R is 0.8075 (R=0.95×0.85=0.8075) or less and 1.0925 (R=0.95× 1.15=1.0925) or more, the state is determined to be abnormal.

That is, at the normal time, if the normalized effective MA value of the first signal SA whose amplitude is controlled constant by AGC of an excitation circuit section 20 is 1.00 and the effective value MB of the second signal is 0.95, the ratio R is R=MB/MA=0.95/1.00=0.95.

At the abnormal time, the ratio R is R=0.95×(1−0.15) =0.8075 or less or R=0.95×(1+0.15)=1.0925 or more.

The anomaly diagnosis section 104 directly receives hold voltages MA and MB of the effective values of the first signal and the second signal, compares the side where the amplitude is not controlled constant, namely, in the embodiment, the second signal MB with a threshold value, and can give an alarm of an anomaly of the second sensor (downward sensor) 16 detecting the signal.

Figure 2:
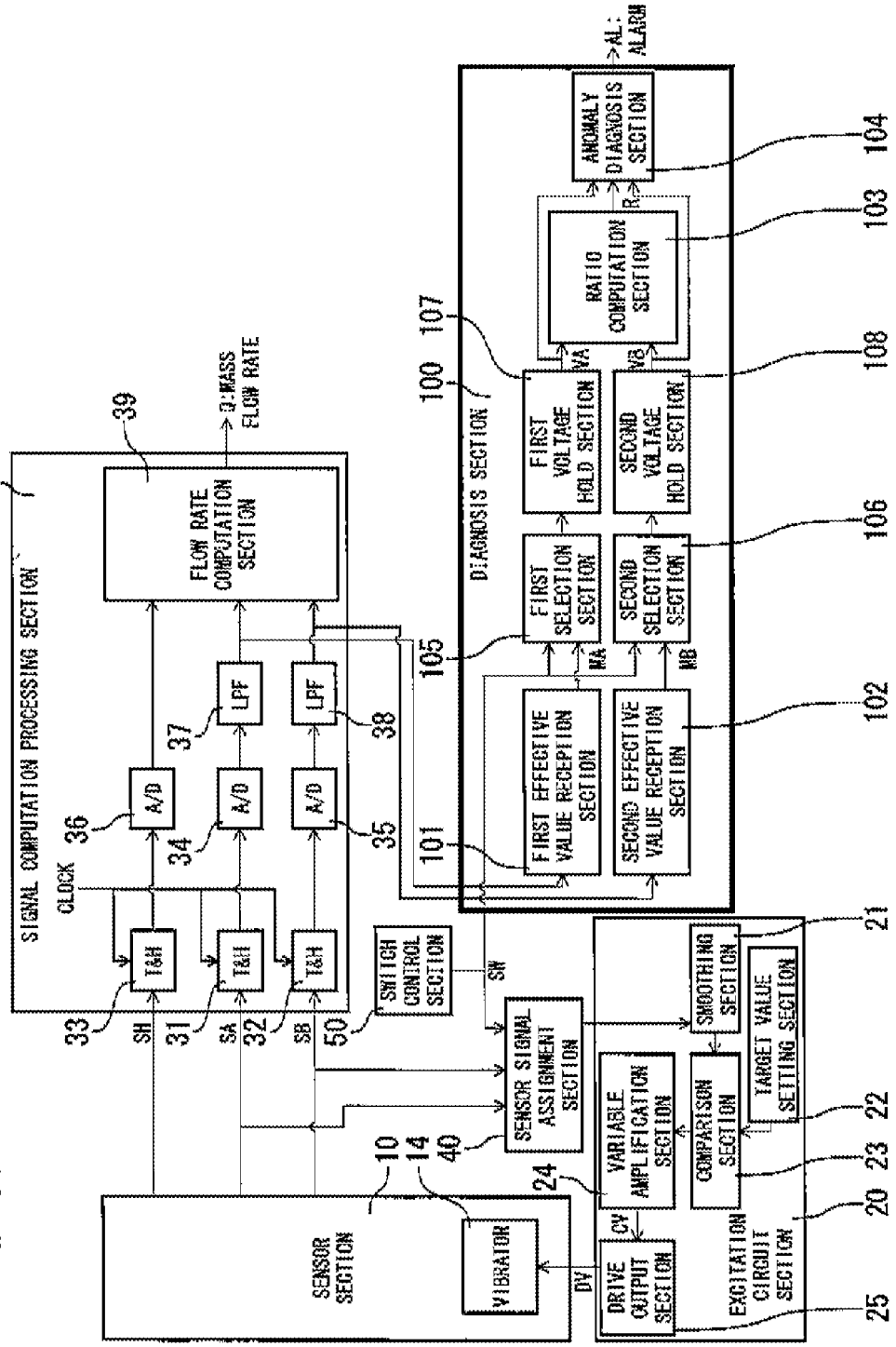
FIG. 2 is a function block diagram to show another embodiment of a Coriolis mass flowmeter according to the invention.

FIG. 2 is a function block diagram to show another embodiment of a Coriolis mass flowmeter according to the invention. The difference from the embodiment in FIG. 1 will be discussed. A first signal SA and a second signal SB are switched periodically by a sensor signal assignment section 40 and the switched signal is input to a smoothing section 21 of an excitation circuit section 20 having an AGC function.

The sensor signal assignment section 40 is subjected to toggle operation by a switch control signal SW from a switch control section 50. The switch control signal SW is given to a first selection section 105 and a second selection section 106 of a diagnosis section 100.

The first selection section 105 and the second selection section 106 select an effective value MA of the first signal SA and an effective value MB of the second signal SB, pass the values to a first voltage hold section 107 and a second voltage hold section 108, and cause them to hold the values.

A ratio computation section 103 receives a hold voltage VA of the first voltage hold section 107 and a hold voltage VB of the second voltage hold section 108, computes a ratio R, and passes the ratio R to an anomaly diagnosis section 104. The operation of the anomaly diagnosis section 104 is similar to that of the embodiment in FIG. 1.

If a signal input to the excitation circuit section 20 by the sensor signal assignment section 40 is the first signal SA, the first selection section 105 does not output the effective value MA to the first voltage hold section 107. On the other hand, if the signal input to the excitation circuit section 20 is the second signal SB, the first selection section 105 outputs the effective value MA to the first voltage hold section 107.

If a signal input to the excitation circuit section 20 by the sensor signal assignment section 40 is the second signal SB, the second selection section 106 does not output the effective value MB to the second voltage hold section 108. On the other hand, if the signal input to the excitation circuit section 20 is the first signal SA, the second selection section 106 outputs the effective value MB to the second voltage hold section 108.

The advantage in the embodiment is to make good the detection sensitivity of anomaly diagnosis. In the embodiment, a sensor signal used as a criterion of AGC of the excitation circuit section 20 is switched and attention is focused on a sensor signal which is not a criterion. AGC always works so as to keep the voltage of the sensor signal constant. At the normal time, when the first signal SA and the second signal SB are switched, both signals are controlled to a constant value and no change is observed.

For example, it is assumed that the voltage of the first signal SA is smaller than the voltage of the second signal SB because of an anomaly of a measurement conduct line. At this time, when the first signal SA is criterion of AGC, the voltage of the second signal SB becomes larger than the criterion.

Next, when the criterion of AGC is switched and the second signal SB is the reference of AGC, the voltage of the first signal SA becomes smaller than the criterion. In the embodiment, sensor voltage which is not the criterion of AGC is compared.

That is, when the criterion of AGC is not switched (the criterion is the first signal SA) as in the embodiment in FIG. 1, the voltage of SA becomes the criterion and the hold voltage VB of the second signal SB becomes larger than the criterion.

On the other hand, in the technique of switching the reference of AGC as in the embodiment in FIG. 2, the hold voltage VA of the first signal SA becomes smaller than the reference and the hold voltage VB of the second signal SB becomes larger than the reference. That is, when reference input of AGC is switched, the difference between VA and VB is enlarged and the ratio of both largely changes, so that the sensitivity of the anomaly diagnosis can be improved.

An operation example of the anomaly diagnosis section 104 will be discussed. For example, at the normal time, it is assumed that the first signal SA and the second signal SB deviate about 5%. However, the deviation varies because of disturbance. If a threshold value is set for detecting the effect of partial corrosion only when they deviate ±15 or more, if the ratio R is 0.7691 or less and 1.0405 or more, the state is determined to be abnormal.

That is, at the normal time, if the normalized effective MA value of the first signal SA whose amplitude is controlled constant by AGC of an excitation circuit section 20 is 1.00 and the effective value MB of the second signal is 0.95, the value is one of ratio computation.

By switching, if the effective MB value of the second signal SB controlled constant by AGC is 1.00 and the effective value MA of the first signal is 1.05, the value is the other of ratio computation. The ratio R at the normal time is R=MB/ MA=0.95/1.05=0.9048.

At the abnormal time, the ratio R is R=0.9048×(1−0.15) =0.7691 or less or R=0.9048×(1+0.15)=1.0405 or more.

The anomaly diagnosis section 104 directly receives hold voltages VA and VB of the effective values of the first signal and the second signal, compares the voltage on the side which is not the criterion of AGC with a threshold value, and can give an alarm of an anomaly of each of the first sensor (upstream sensor) 15 and the second sensor (downstream sensor) 16 detecting the signals individually. Further, if the hold voltage VA and the hold voltage VB increase or decrease uniformly exceeding the threshold value, an alarm of uniform corrosion of the measurement conduct line can be given.

Figure 3:
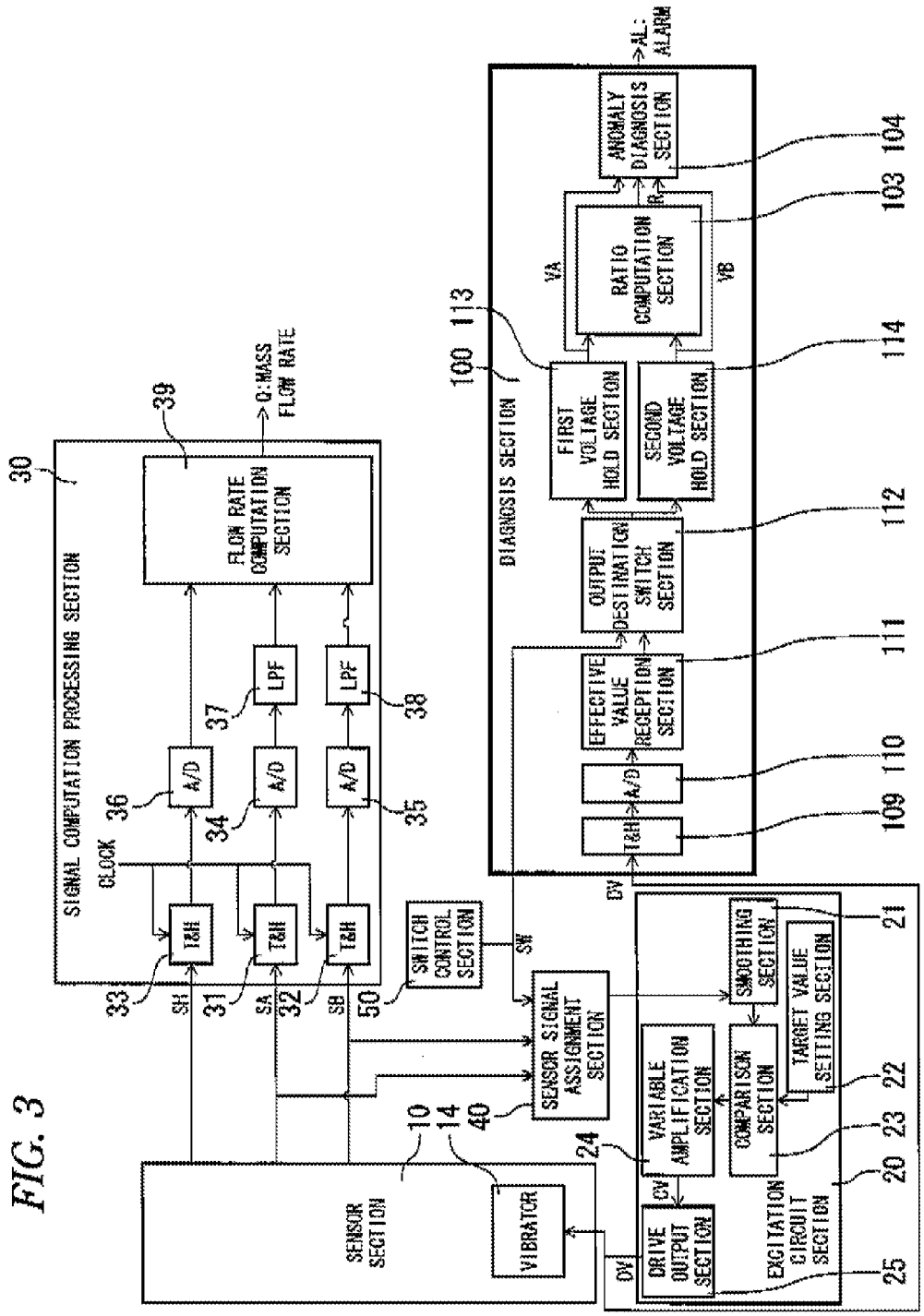
FIG. 3 is a function block diagram to show still another embodiment of a Coriolis mass flowmeter according to the invention.
Figure 4:
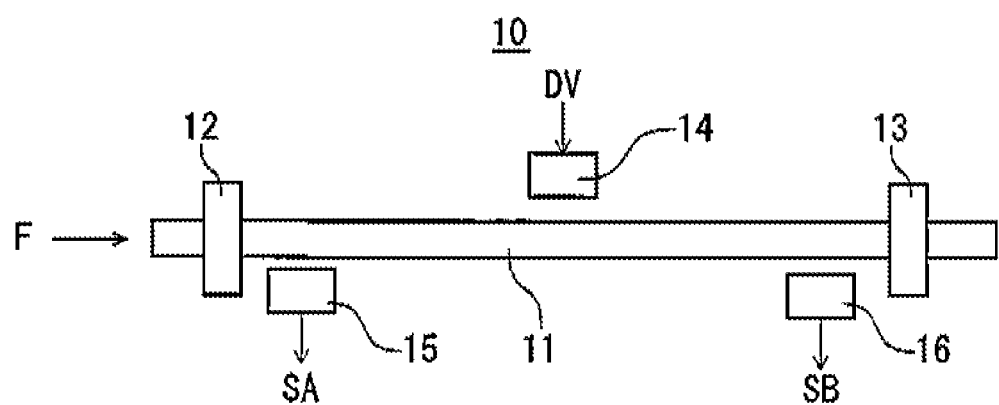
FIG. 4 is a basic configuration drawing of the sensor section of the Coriolis mass flowmeter.
Figure 5:
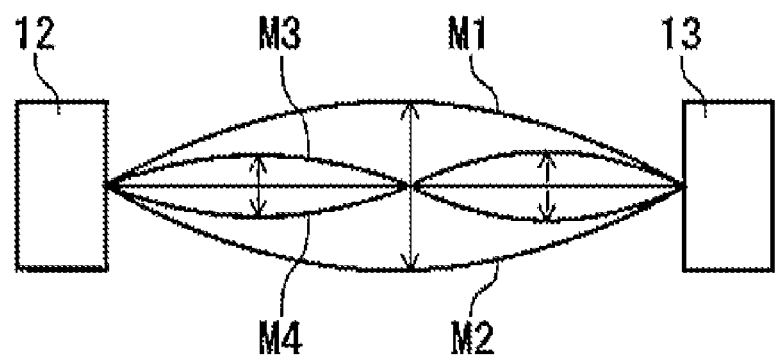
FIG. 5 is a schematic drawing to describe primary mode and secondary mode vibration.

FIG. 3 is a function block diagram to show still another embodiment of a Coriolis mass flowmeter according to the invention. The configuration in which a first signal SA and a second signal SB are periodically switched by a sensor signal assignment section 40 and the switched signal is input to a smoothing section 21 of an excitation circuit section 20 including the AGC function is the same as that of the embodiment in FIG. 2.

The embodiment in FIG. 3 is characterized by the fact that a diagnosis section 100 receives as a monitor target a drive signal DV output from the excitation circuit section 20 executing AGC to a vibrator 14 rather than the effective values of the first signal SA and the second signal SB as in the embodiments in FIGS. 1 and 2.

The drive signal DV input to the diagnosis section 100 is converted into a digital signal by an analog/digital converter 110 through a track-and-hold 109 and the effective value is held in an effective value reception section 111.

If the criterion of AGC is selected as the first signal SA, an output destination switch section 112 outputs the hold voltage of the effective value reception section 111 to a first voltage hold section 113 and if the criterion of AGC is selected as the second signal SB, the output destination switch section 112 outputs the hold voltage of the effective value reception section 111 to a second voltage hold section 114 according to a switch control signal SW of a switch control section 50.

A ratio computation section 103 receives a hold voltage VA of the first voltage hold section 113 and a hold voltage VB of the second voltage hold section 114, computes a ratio R, and passes the ratio R to an anomaly diagnosis section 104. The operation of the anomaly diagnosis section 104 is similar to that of the embodiment in FIG. 1.

An operation example of the anomaly diagnosis section 104 will be discussed. For example, at the normal time, it is assumed that the first signal SA and the second signal SB deviate about 5%. However, the deviation varies because of disturbance. If a threshold value is set for detecting the effect of partial corrosion only when they deviate ±15 or more, if the ratio R is 0.7691 or less and 1.0405 or more, the state is determined to be abnormal.

That is, at the normal time, if the normalization value of a gain of the drive signal DV when a signal whose amplitude is controlled constant by AGC of the excitation circuit section 20 is the first signal SA is 1.00, the normalization value of a gain of the drive signal DV when a signal whose amplitude is controlled constant by AGC of the excitation circuit section 20 is the second signal SB is 0.95. The ratio R at the normal time is R=VB/VA=0.95/1.05=0.9048.

At the abnormal time, the ratio R is R=0.9048×(1−0.15) =0.7691 or less or R=0.9048×(1+0.15)=1.0405 or more.

The anomaly diagnosis section 1C4 directly receives the first hold voltage VA and the second hold voltage VB, compares the voltages with a threshold value and can give an alarm of an anomaly of each of the first sensor 15 and the second sensor 16 detecting the signals individually. Further, if the first hold voltage VA and the second hold voltage VB increase or decrease uniformly exceeding the threshold value, an alarm of uniform corrosion of the measurement conduct line can be given.

In the embodiments in FIGS. 1 and 2, the effective values of the first signal SA and the second signal SB are input to the diagnosis section 100 as digital signals passed through the low-pass filters 37 and 38, but the signals may be analog signals directly obtained from a sensor section 10. In this case, the ratio computation section 103 executes ratio computation of the analog signals.

In the embodiment in FIG. 3, the drive signal DV from the excitation circuit section 20 executing AGC to the vibrator 14 is input to the diagnosis section 100 as the monitor target, but output voltage CV of the variable amplifier 24 of the excitation circuit section 20 may be input to the diagnosis section 100.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A Coriolis mass flowmeter comprising:
   a vibrator configured to vibrate a measurement conduct line;
   an upstream sensor and a downstream sensor, which are placed at a certain distance in the measurement conduct line and are configured to detect vibration of the measurement conduct line;
   a signal computation processing section configured to compute a mass flow rate of a fluid flowing through the measurement conduct line vibrated by the vibrator based on a phase difference between a first signal of the upstream sensor and a second signal of the downstream sensor;
   an excitation circuit section configured to receive the first signal or the second signal and to control a drive signal of the vibrator so that the amplitude of the first signal or the second signal becomes a target value;
   a first effective value reception section configured to receive an effective value of the first signal;
   a second effective value reception section configured to receive an effective value of the second signal;
   a ratio computation section configured to receive the effective value of the first signal and the effective value of the second signal and to compute the ratio of both values; and
   an anomaly diagnosis section configured to make a comparison between the computed ratio and a certain value and to generate an alarm;
   wherein the excitation circuit section is configured to receive the first signal or the second signal, when said first signal and said second signal are switched periodically as inputs to said excitation circuit section, and to control the drive signal of the vibrator so that the amplitude of the received signal becomes the target value, and
   wherein the ratio computation section is configured to receive a hold voltage of the effective value of the first signal and a hold voltage of the effective value of the second signal in operative association with the switching, and to compute the ratio of both voltages.

2. The Coriolis mass flowmeter as claimed in claim 1 further comprising:
   an analog/digital converter configured to convert the first signal and the second signal into digital signals,
   wherein the effective value of the first signal and the effective value of the second signal are given based on digital values of the digital signals.

3. The Coriolis mass flowmeter as claimed in claim 1 wherein the effective value of the first signal and the effective value of the second signal are given based on detection values of the first signal and the second signal.

4. The Coriolis mass flowmeter as claimed in claim 1 wherein the anomaly diagnosis section is configured to directly receive the hold voltages of the effective values of the first signal and the second signal, to compare one of the voltages with a threshold value, and to generate an alarm.

5. A Coriolis mass flowmeter comprising:
   a vibrator configured to vibrate a measurement conduct line;

an upstream sensor and a downstream sensor, which are placed at a certain distance in the measurement conduct line and are configured to detect vibration of the measurement conduct line;

a signal computation processing section configured to compute a mass flow rate of a fluid flowing through the measurement conduct line vibrated by the vibrator based on a phase difference between a first signal of the upstream sensor and a second signal of the downstream sensor;

a sensor signal assignment section configured to periodically switch the first signal and the second signal;

an excitation circuit section configured to receive the first signal or the second signal switched periodically and to control a drive signal of the vibrator so that the amplitude of the received signal becomes a target value;

a ratio computation section configured to receive a hold voltage of an effective value of the drive signal of the vibrator or a hold voltage of an effective value of a signal proportional to the drive signal in operative association with the switching, and to compute the ratio of both voltages; and an anomaly diagnosis section configured to make a comparison between the computed ratio and a threshold value, and to generate an alarm.

6. The Coriolis mass flowmeter as claimed in claim 5 wherein the anomaly diagnosis section is configured to directly receive the hold voltage of the effective value of the drive signal of the vibrator or the hold voltage of the effective value of the signal proportional to the drive signal in operative association with the switching, to compare the voltage with a threshold value, and to generate an alarm.

* * * * *